Feb. 23, 1971  B. REYNOLDS ET AL  3,565,588
GAS GENERATOR AND WASTE HEAT BOILER INTERCONNECTED SYSTEM
Filed June 24, 1968
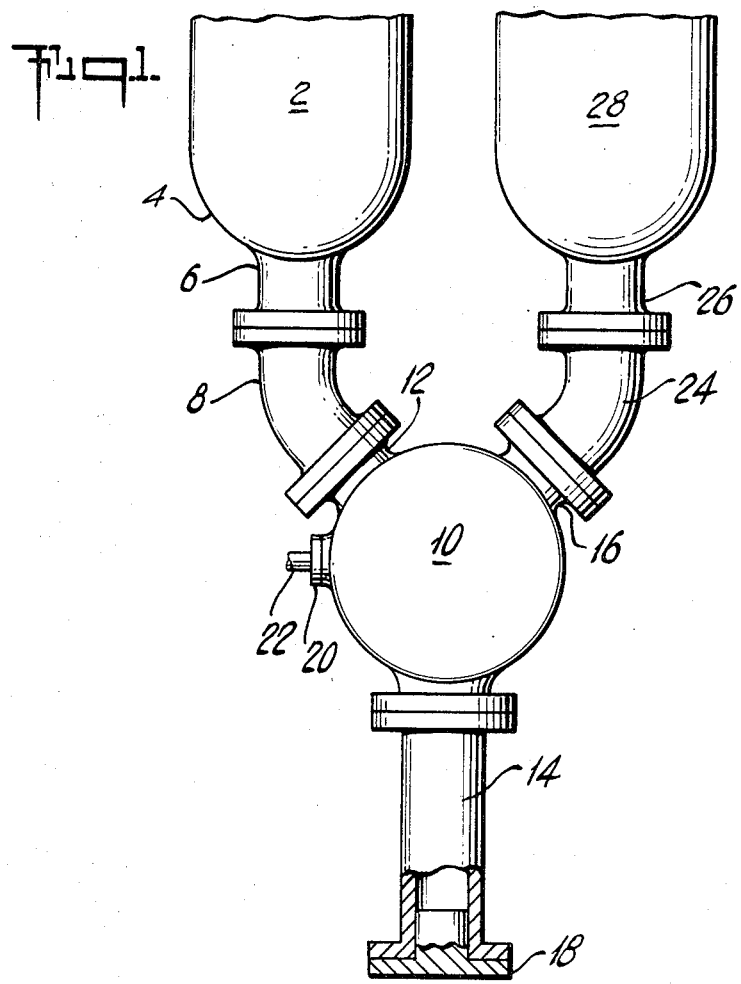
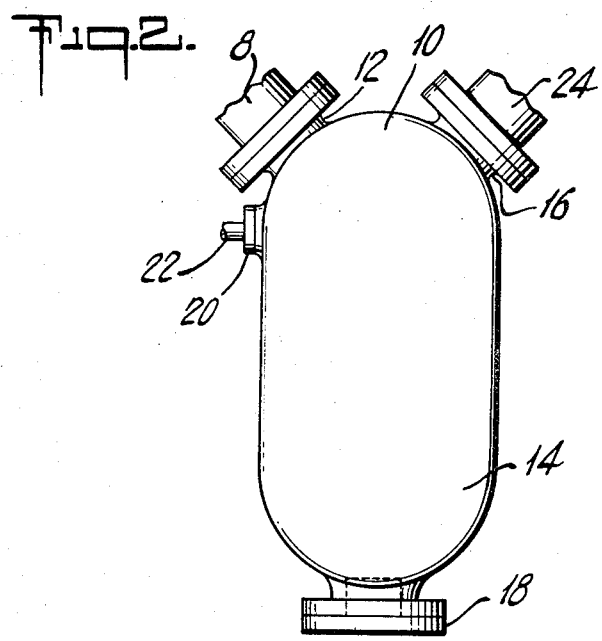

United States Patent Office 3,565,588
Patented Feb. 23, 1971

3,565,588
GAS GENERATOR AND WASTE HEAT BOILER
INTERCONNECTED SYSTEM
Blake Reynolds, Riverside, Conn., and Charles P. Marion, Mamaroneck, N.Y., assignors to Texaco Development Corporation, New York, N.Y., a corporation of Delaware
Filed June 24, 1968, Ser. No. 739,418
Int. Cl. C10b 1/00; C10g 11/28, 13/30
U.S. Cl. 23—277
9 Claims

ABSTRACT OF THE DISCLOSURE

A system comprising a generator for synthesis gas and a waste heat boiler interconnected by a plenum with or without a separable catchpot at the hemispherical ends thereof for removal of slag and other debris from the gas-generator effluent synthesis gas between the generator exit and the waste-heat-boiler entrance.

BACKGROUND OF THE INVENTION

This invention relates to a connector between a gas generator, for preparing synthesis gas consisting essentially of carbon monoxide and hydrogen by the partial combustion of hydrocarbons, oxygenated compounds and the like, and a waste heat boiler, and more particularly to a connector in a high pressure system joining the bottom hemispherical section of a gas generator to the bottom hemispherical section of a waste heat boiler. The temperature in the reaction zone of a gas generator where synthesis gas generation proceeds by the controlled combustion of a carbonaceous material is desirably at a temperature of at least 2000° F. and frequently as high as 3000° F. The effluent gases being discharged are at about the same temperature; the operating pressure often is in excess of 1000 p.s.i.a. and may range up to 2500 p.s.i.a. or more, but is not limited to high pressures.

Prior to the present invention, the effluent was discharged via an exit passage in the gas generator through a connecting conduit to a side entrance in a waste heat boiler for cooling of the effluent to a temperature of about 600° F. or less, so as to recover heat in the form of useful high-or medium-pressure steam and to obtain more suitable temperatures for subsequent processing.

For structural reasons, the thickness of the nozzle wall and the amount of reinforcement necessary to retain the nozzle in place in the side entrance of the waste heat boiler is determined by the high pressure exerted on the waste heat boiler walls. To build larger waste heat boilers to accommodate present day high pressure demands will require heavier nozzles and increased reinforcing.

Gas generators are presently operated to produce a controlled amount of unconverted carbon to retain metals, such as vanadium and nickel, which are present in some hydrocarbon feedstocks. The metals remain with the unconverted carbon in the form of a low density soot which passes out of the system with the synthesis gas through the waste heat boiler. However, if the gas generator is operated improperly, an insufficient quantity of unconverted carbon can be produced in the gas generator with resulting formation of a high density slag, which if not removed from the effluent gas, may form an obstruction in the waste heat boiler requiring corrective maintenance action.

Pieces of refractory and debris from the gas generator also can pass into and obstruct the waste heat boiler. Therefore, it is desirable to prevent such materials from entering the waste heat boiler.

SUMMARY OF THE INVENTION

It is an overall object of this invention to provide a means to remove the heavier slags from the synthesis gas prior to its passage through the waste heat boiler.

A further object is to remove refractory and debris from the synthesis gas before they enter the waste heat boiler.

Other objects and advantages of the invention will appear from the following description when taken in conjunction with the attached drawing.

Briefly stated, the present invention provides for a novel plenum interconnection, with or without a separable catchpot, between a gas generator and a waste heat boiler wherein the connections between the gas generator and the plenum and between the plenum and the waste heat boiler are made in the spherical surfaces of each.

BRIEF DESCRIPTION OF THE DRAWING

FIGS. 1 and 2 are elevation views, FIG. 1 being partly in section, of different embodiments of a system including a gas generator, a waste heat boiler, and a connector therebetween.

DESCRIPTION OF THE PREFERRED EMBODIMENTS

In the drawings, a gas generator 2, into which hydrocarbons (possibly including oxygenated compounds) an oxidant, and often a moderator (such as steam) are introduced for reaction, includes a cylindrical wall 4. The gas generator has a hemispherical end with an effluent nozzle 6 formed therein which is preferably coaxially aligned. Conduit nozzles in spherical surfaces are advantageous in that they do not require as much additional reinforcement as conduit nozzles in cylindrical walls of a vessel. Synthesis gas produced in the gas generator flows through effluent nozzle 6 into a substantially 45° elbow or entrance conduit 8 leading to a plenum 10 with a spherical surface via an entrance nozzle 12. The plenum 10 is preferably spherical being joined at the lower end by a removable vessel 14 which serves as a catchpot (see FIG. 1).

In another embodiment as depicted in FIG. 2, the plenum and catchpot are integrated in a relatively larger cylindrical vessel with hemispherical end sections.

An exit nozzle 16, in the spherical surface of the plenum 10, is located at an angle to the entrance nozzle 12 of between 60° and 120°, preferably 90°, providing an exit passage with a change in direction for the synthesis gas leaving the plenum, so that heavier particles in this gas are removed and collected in the catchpot. The catchpot defines a large chamber where slag removed from the gas generator effluent can be collected for later removal, for example, periodically as part of a maintenance program via a removable plug closure 18. The arrangement of FIG. 1 has the advantage that the removable vessel 14 can be removed readily and replaced by a spare catchpot.

A cover 20 fits an access opening in the wall of the plenum 10, and has provision for an inlet nozzle 22 to fit therethrough which may be employed to introduce steam (or other feed material) into the synthesis gas in the plenum 10. Steam is injected into the plenum to moderate the temperature of the gases therein and to increase the hydrogen concentration in the synthesis gas by the watergas shift reaction according to the known reaction:

$$H_2O + CO \rightleftharpoons CO_2 + H_2$$

Alternatively, other gases, such as carbon dioxide, may be introduced into the plenum 10 to adjust the $H_2/CO$ ratio by shifting the above reaction or to carry out other reactions, such as the reforming of methane. The size of this plenum is selected according to the kinetics of the reaction rates so as to use all of the heat available between the inlet gas temperature and the lowest practicable exit gas temperature. This use of the plenum has the advantages (1) that any required endothermic heat of reaction is supplied by the sensible enthalpy of the generator-effluent gas and (2) that oxygen is saved by not feeding the $H_2O$, $CO_2$ or other reactant to the generator itself.

An interconnecting conduit 24, preferably a 45° elbow, joins the exit nozzle 16 to an entry nozzle 26 preferably coaxial in the hemispherical end section of a waste heat boiler 28 providing a passage for the synthesis gas thereinto.

The entire system is made from metal which is lined with suitable refractory, including the entry nozzle 26, thus providing insulation from the high temperature gases passing therethrough.

For convenience of construction, the plenum 10 is located below and symmetrically between the gas generator 2 and the waste heat boiler 28.

An alternate embodiment (not shown) includes two or more plena, each interconnected in series through their spherical surfaces by elbows. The gas generator spherical surface is associated with the entrance nozzle of the first plenum, and the waste heat boiler spherical surface is associated with the exit nozzle of the second plenum.

In the system, all parts are coupled together, with bolts through flanges provided thereon, although some parts or all may be made integral with each other.

Preferably, only one pair of flanges is used for each of the two connections (1) from effluent nozzle 6 to entrance nozzle 12 and (2) from exit nozzle 16 to entry nozzle 26.

Inasmuch as various modifications may be made in the form of the invention herein disclosed and in the location of the parts of the apparatus without departing from the principles thereof, it should be understood that the invention is not to be limited except by the scope of the appended claims.

We claim:

1. In a system operating at elevated temperatures and pressures for generating synthesis gas including a gas generator and waste heat boiler, each having a spherical lower surface, the improvement comprising an interconnection therebetween, including:

(a) a plenum with a spherical end surface having a catchpot incorporated therewith for the collection of unwanted materials from the gas generator effluent and located below said gas generator and said boiler, (b) means interconnecting the lower spherical surface of said gas generator with said spherical end surface of said plenum and providing a flow passage therebetween for the effluent from said gas generator, and (c) means interconnecting said spherical end surface of said plenum with the lower spherical surface of said waste heat boiler and providing a flow passage therebetween for said gas generator effluent.

2. In a system as defined in claim 1, wherein the centerlines of said means of (b) and said means of (c) at their intersections with said spherical end surface of said plenum subtend an angle of between 60° and 120°.

3. In a system as defined in claim 2, the subtended angle being substantially a right angle.

4. In a system as defined in claim 1, said means of (b) leaving from said spherical lower surface of said gas generator coaxially, and said means of (c) joining said spherical lower surface of said waste heat boiler coaxially.

5. In a system as defined in claim 1, said catchpot being removably joined to the lower end of said plenum.

6. In a system as defined in claim 1, said catchpot and said plenum comprising an integral cylindrical vessel with substantially spherical ends.

7. In a system as defined in claim 1, said plenum being provided with a wall nozzle for the introduction of a reactant.

8. In a system as defined in claim 1, said plenum being located symmetrically between said gas generator and said waste heat boiler, and said means of (b) and said means of (c) each being axially curved to form an arc.

9. In a system as defined in claim 8, said arc subtending a 45° angle.

References Cited
UNITED STATES PATENTS

| | | | |
|---|---|---|---|
| 2,605,178 | 7/1952 | Hemminger | 48—215 |
| 2,825,628 | 3/1958 | Johannsen et al. | 23—284X |
| 3,215,502 | 11/1965 | Korwin | 23—277 |

MORRIS O. WOLK, Primary Examiner

R. E. SERWIN, Assistant Examiner

U.S. Cl. X.R.

48—95, 105, 107, 215